UNITED STATES PATENT OFFICE.

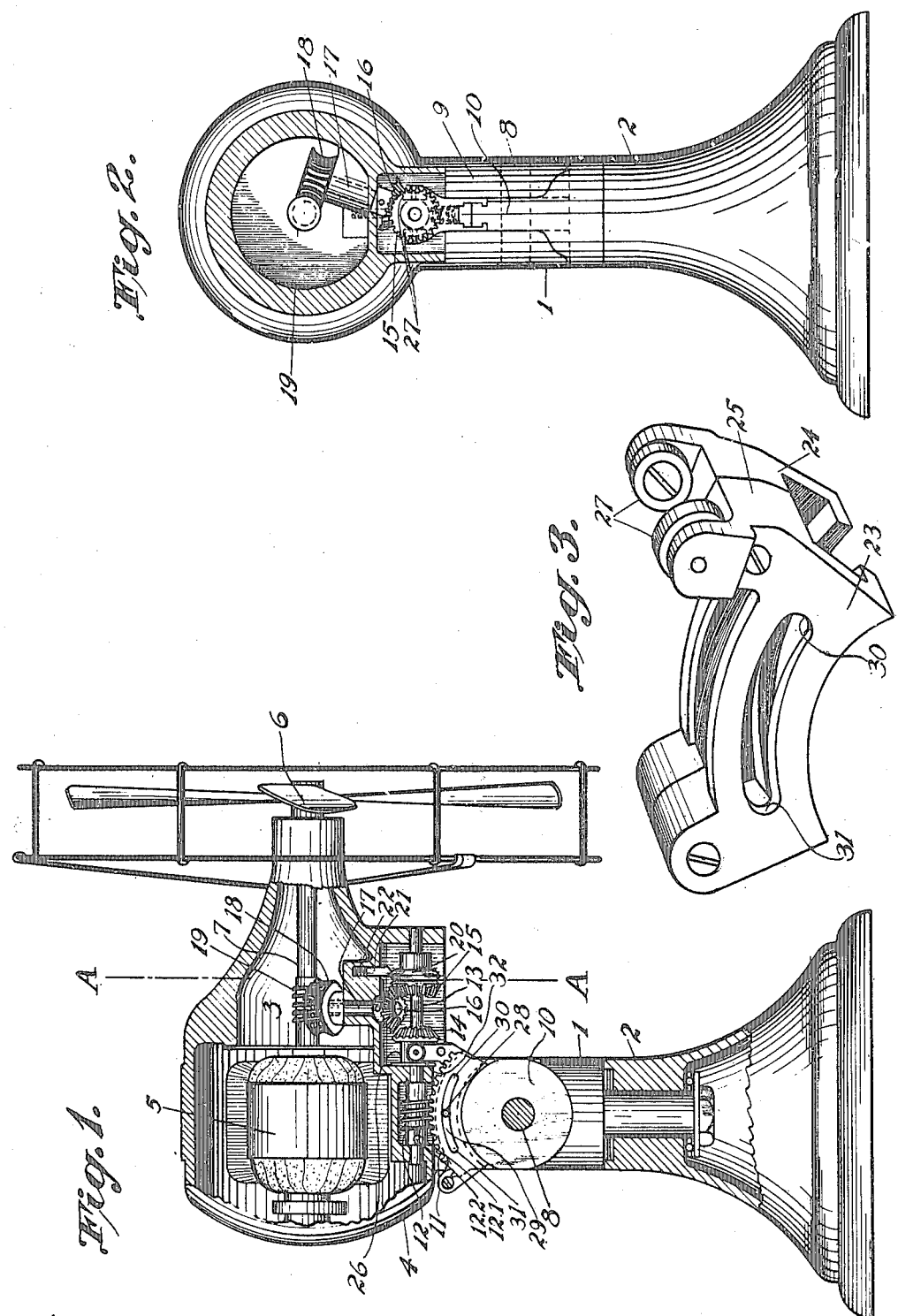

EDWIN P. PHELPS, OF WILMETTE, ILLINOIS, ASSIGNOR TO WILLARD M. McEWEN, OF CHICAGO, ILLINOIS.

AIR-CIRCULATING DEVICE.

1,196,275.   Specification of Letters Patent.   Patented Aug. 29, 1916.

Application filed January 3, 1916. Serial No. 69,970.

*To all whom it may concern:*

Be it known that I, EDWIN P. PHELPS, a citizen of the United States of America, and a resident of Wilmette, county of Cook, and State of Illinois, have invented certain new and useful Improvements in Air-Circulating Devices, of which the following is a specification.

The main objects of this invention are to provide an oscillating fan of the type shown in the copending application of Willard M. McEwen, Serial No. 29,129, filed May 19, 1915, having improved mechanism for causing the tilting movement of the fan; and to provide an improved arrangement of the mechanism whereby it may be compactly concealed within the motor casing.

An illustrative embodiment of this invention is shown in the accompanying drawings, in which—

Figure 1 is a side elevation partly sectional of an electric fan equipped with the improved tilting mechanism. Fig. 2 is a front elevation partly sectional of the same, as viewed from the plane of the line A—A of Fig. 1. Fig. 3 is a detail in perspective of the clutch shifting member.

In the construction shown in the drawings, a member or shaft 1 is rotatably mounted on a base or support 2 and carries blower mechanism 3 pivotally connected thereto. The blower mechanism comprises a motor 4, journaled in a housing or casing 5 and connected to rotate a fan 6 mounted on the end of motor shaft 7. The casing 5 is pivoted to the member 1 by means of a pin 8 connecting the bifurcated lug or stem 9, formed on the under side of said casing, with a stem or lug 10 formed on the member 1.

The mechanism for tilting the blower mechanism comprises a gear sector 11 formed on the stem 10 concentrically with the pin 8 and a worm 12 carried on a shaft 13 journaled in the motor casing 5. The worm 12 is suitably keyed or splined to the shaft 13, as represented by the pin 12.1 and slot 12.2, so as to shift relatively thereof and at the same time be positively rotated thereby. The shaft 13 is mounted in the casing 5 substantially parallel with the motor shaft 7 and is shiftable axially. A pair of beveled gears 14 and 15, carried by the shaft 13, are arranged to mesh with a third gear 16 so that the shaft 13 may be driven in different directions, depending upon which of the gears 14 and 15 are in mesh with the gear 16. The gear 16 is carried on a shaft 17 journaled in the casing 5 at right angles to the shaft 13, and connected to the motor shaft 7 by means of a gear 18 and worm 19.

Clutch mechanism for regulating the engagement of the gears 14 and 15 with the gears 16 comprises a cam 20 formed of two cones arranged base to base and rigidly secured to the shaft 13. One or the other face of the cam is engaged by a pin 21, normally actuated by a spring 22, so that the corresponding gear 14 or 15 is firmly held in mesh with the gear 16.

The clutch shifting mechanism includes a pair of plates 23 and 24 slidably mounted on the stem 10 and connected together by screws 10.1 and provided with a fork 25 embracing a collar 26 on the shaft 13. The fork 25 is provided with anti-friction rollers 27. Pins 28 secured to the stem 10 extend through slots 29 formed in the plates 23 and 24 and coact with the shoulders 30 and 31 formed at the ends of said slots for limiting the movement of the plates 23 and 24 and thereby causing a shifting of the shaft 13 so as to change the driving connection between the gears 14, 15 and 16.

The present device employs the same principle of oscillation explained in the hereinbefore mentioned co-pending application, wherein by tilting the axis of rotation of the fan in a vertical plane, gyratory forces are brought into action, which cause the fan to shift back and forth in a horizontal plane. The tilting is effected by the coaction of the worm 12 and gear sector 11, and since the member 1 is freely journaled on the base 2, the fan is permitted to swing horizontally, in either direction. By the action of the gyratory forces referred to, the direction of horizontal swinging is reversed whenever the vertical tilting is reversed and the length of the swing depends upon the rapidity with which the change in the direction of tilting occurs.

The change in the direction of tilting of the blower mechanism is controlled by the change in the engagement of the gears 14 and 15 with the gears 16, which in turn is controlled by the clutch shifting member 23—24.

As the worm 12 approaches one end of the gear sector 11 the corresponding shoulders 30 or 31, at the ends of the slots 29, engage the pins 28, whereupon further movement of the worm 12 causes the fork 25 to exert a pressure against the gear 14 or the collar 32 as the case may be. This pressure is in turn exerted by the cam 20 upon the pin 21, and as the shaft 13, under the pressure of the fork 25, is caused to move axially the pin will ride up the incline of the cam. As soon as the crown of the cam 20 passes the pin 21 the pressure of the spring 22 acting on said pin and cam augments the shifting of the shaft 13 and instantly changes the engagement of the gear 16 from one to the other of the gears 14 or 15.

Although but one specific embodiment of this invention has been herein shown and described, it will be understood that numerous details of the construction shown may be altered or omitted without departing from the spirit of this invention as defined by the following claims.

I claim:

1. In an air circulating device, the combination of a support, a member rotatably mounted thereon, blower mechanism tiltably mounted on said member, a gear sector on said member, a gear carried by said mechanism and meshing with said gear sector, said gear being rotatably connected to said mechanism whereby said gear and rack coact to tilt said blower mechanism, and means for reversing the rotation of said gear.

2. In an air circulating device, the combination of a support, a member rotatably mounted thereon, blower mechanism tiltably mounted on said member, a gear sector on said member, a shaft journaled on said blower mechanism, a gear carried by said shaft and meshing with said gear sector, gearing connecting said shaft to be rotated by said blower mechanism whereby said gear and gear sector coact to tilt said blower mechanism, and coacting means on said gearing and said member adapted to shift said gearing for reversing the rotation of said gear.

3. In an air circulating device, the combination of a support, a member rotatably mounted thereon, blower mechanism tiltably mounted on said member, a gear sector on said member, a shaft journaled on said blower mechanism, a gear carried by said shaft and meshing with said gear sector, gearing connecting said shaft to be rotated by said blower mechanism whereby said gear and gear sector coact to tilt said blower mechanism, clutch mechanism connected to said gearing, and coacting shoulders on said clutch mechanism and said member adapted to shift said clutch mechanism for causing said gearing to alternate the direction of rotation of said gear.

4. In an air circulating device, the combination of a support, a member rotatably mounted thereon, blower mechanism tiltably mounted on said member, a gear sector formed on said member concentrically with the axis of the connection of the blower mechanism thereto, a shaft journaled on said blower mechanism, a worm carried by said shaft and meshing with said gear sector, gearing connecting said shaft with said blower mechanism so as to be rotated thereby, and coacting means on said member and blower mechanism adapted to reverse the action of said gearing.

5. In an air circulating device, the combination of a support, a member rotatably mounted thereon, motor driven blower mechanism tiltably mounted on said member, a gear sector formed on said member concentrically with the axis of the connection of the blower mechanism thereto, a shaft journaled on said blower mechanism substantially parallel with the shaft of the motor, a worm carried by said shaft and engaging said rack, gearing for rotatably connecting said shaft with the motor, an arm connected to said gearing, and a shoulder on said member adapted to be engaged by said arm for shifting said gearing so as to reverse the driving action of said worm.

Signed at Chicago this 31st day of Dec. 1915.

EDWIN P. PHELPS.